(12) United States Patent
Cheng et al.

(10) Patent No.: US 10,799,822 B2
(45) Date of Patent: Oct. 13, 2020

(54) FIXING DEVICE FOR THE DUST BAG OF A DUST COLLECTOR

(71) Applicant: SAN FORD MACHINERY CO., LTD., Taichung (TW)

(72) Inventors: Yuan-Tai Cheng, Taichung (TW); Benjamin Ole Sten Helshoj, Irvine, CA (US)

(73) Assignee: SAN FORD MACHINERY CO., LTD., Taichung (TW)

( * ) Notice: Subject to any disclaimer, the term of this patent is extended or adjusted under 35 U.S.C. 154(b) by 208 days.

(21) Appl. No.: 16/111,084

(22) Filed: Aug. 23, 2018

(65) Prior Publication Data

US 2020/0061508 A1   Feb. 27, 2020

(51) Int. Cl.
  *B01D 46/02*   (2006.01)
  *B01D 46/48*   (2006.01)
  *B01D 46/00*   (2006.01)
  *A47L 9/14*   (2006.01)

(52) U.S. Cl.
  CPC ........ *B01D 46/0005* (2013.01); *A47L 9/1427* (2013.01); *B01D 46/02* (2013.01)

(58) Field of Classification Search
  CPC ............... B01D 46/0005; B01D 46/02; B01D 46/2403; B01D 46/0075; B01D 46/48; A47L 9/1427
  USPC ........... 55/341.1, 378, 385.1, 429, 467, 493, 55/DIG. 18
  See application file for complete search history.

(56) References Cited

U.S. PATENT DOCUMENTS

| | | | | |
|---|---|---|---|---|
| 3,650,095 | A | * | 3/1972 | Welch ................ B01D 46/2403 55/493 |
| 3,877,900 | A | * | 4/1975 | Mitchell ............... A47L 7/0095 55/366 |
| 5,163,985 | A | * | 11/1992 | Chen ........................ A47L 5/28 55/356 |
| 6,875,248 | B1 | * | 4/2005 | Shelton ................ B01D 46/002 55/341.1 |
| 2005/0039295 | A1 | * | 2/2005 | Werning ............... A47L 9/1427 15/314 |
| 2009/0025348 | A1 | * | 1/2009 | Cheng .................... B01D 46/02 55/385.1 |
| 2009/0151306 | A1 | * | 6/2009 | Lin .................... B01D 46/2403 55/295 |
| 2009/0158549 | A1 | * | 6/2009 | Lin ........................ B01D 46/48 15/347 |
| 2010/0322539 | A1 | * | 12/2010 | Cheng .................... B01D 46/02 383/33 |
| 2011/0167586 | A1 | * | 7/2011 | Szommer .................. A47L 5/28 15/347 |
| 2012/0272631 | A1 | * | 11/2012 | Lin .......................... A47L 9/00 55/467 |
| 2016/0230713 | A1 | * | 8/2016 | Khami ............... F02M 35/0203 |

* cited by examiner

Primary Examiner — Minh Chau T Pham
(74) Attorney, Agent, or Firm — Sinorica, LLC (57) ABSTRACT

A fixing device for the dust bag of a dust collector includes a dust collector provided with a wind guide box having its lower side formed with a stuff falling opening, which extends downward to form a ring body. The wind guide box has its outer circumference provided with two tightening units, and an annular frame is connected between the two tightening units and positioned beneath the ring body. The two tightening units can adjust the annular frame to be at a first position or at a second position able to quickly fix or disassemble the dust bag of a dust collector.

4 Claims, 8 Drawing Sheets

FIXING DEVICE FOR THE DUST BAG OF A DUST COLLECTOR

BACKGROUND OF THE INVENTION

1. Field of the Invention

This invention relates to a dust collector, particularly to a fixing device for the dust bag of a dust collector, and the fixing device is simple in structure and able be fixed or disassembled quickly.

2. Description of the Prior Art

Generally, a conventional dust collector includes a wind guide box formed with a stuff falling opening extending downward to form an annular flange for installing a dust bag. Generally, the dust bag is directly fitted around the outer wall of the annular flange of the stuff falling opening and then the bag mouth of the dust bag is tightened on the annular flange by means of a cingule, letting the dust bag mounted under the stuff falling opening. Thus, when the dust collector is operated, dust will be sucked into the dust bag through the wind guide box.

However, the cingule is a long belt, which is thin in thickness, low in hardness and transformable; therefore, assembly of the dust bag has to be completed by two persons to make concerted efforts, letting one person first have the dust bag fitted and fixed around the flange of the stuff falling opening and another person uses two hands respectively to catch hold of two ends of the cingule and seizes an opportunity to have the cingule wound around the flange of the stuff falling opening in a way similar to wearing of a girdle and then fastens the buckle of the cingule, thus able to tightly fix the dust bag on the dust collector. Nevertheless, such assembly method requires much more manpower and is inconvenient in assembly and further has to test tacit understanding between the two assemblers and poor tacit understanding will waste much time in assembly. Therefore, having observed foresaid drawbacks, the inventor of this invention thinks that the conventional fixing device of the dust bag is necessary to be ameliorated and hence devises this invention.

SUMMARY OF THE INVENTION

The objective of this invention is to offer a fixing device for the dust bag of a dust collector, simple in structure and able to fix or disassemble a dust bag directly and quickly by a single person.

The fixing device for the dust bag of a dust collector in the present invention includes a dust collector provided with a wind guide box having its lower side formed with a stuff falling opening, which has its circumference extending downward to form a ring body, and characterized by at least two tightening units and an annular frame. The two tightening units are respectively and correspondingly provided at the outer circumference of the wind guide box, and each tightening unit contains a first fixing member having one end secured on the wind guide box and another end disposed with an adjusting member, which has another end connected with a second fixing member. The annular frame being ring shaped is fixed on the second fixing members and located beneath the ring body. Further, the adjusting member can adjust the annular frame to be at a first position and at a second position. When the annular frame is at the first position, a gap is formed between the annular frame and the ring body, and when the annular frame is adjusted to be at the second position, the annular frame will press against the lower edge of the ring body.

In use of the fixing device for the dust bag of a dust collector of this invention, when a user is to assemble a dust bag on the annular frame, the annular frame is first adjusted to be at the first position and then, the dust bag is inserted and laid in the annular frame and have the opening of the dust bag folded outward reversely to pass out of the gap. Next, the annular frame is adjusted to be at the second position to let the dust bag clamped and fixed in place by both the annular frame and the ring body. When the dust bag is to be disassembled, the annular frame is adjusted to be at the first position and the dust bag can be removed out, thus able to quickly fix or disassemble the dust bag.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
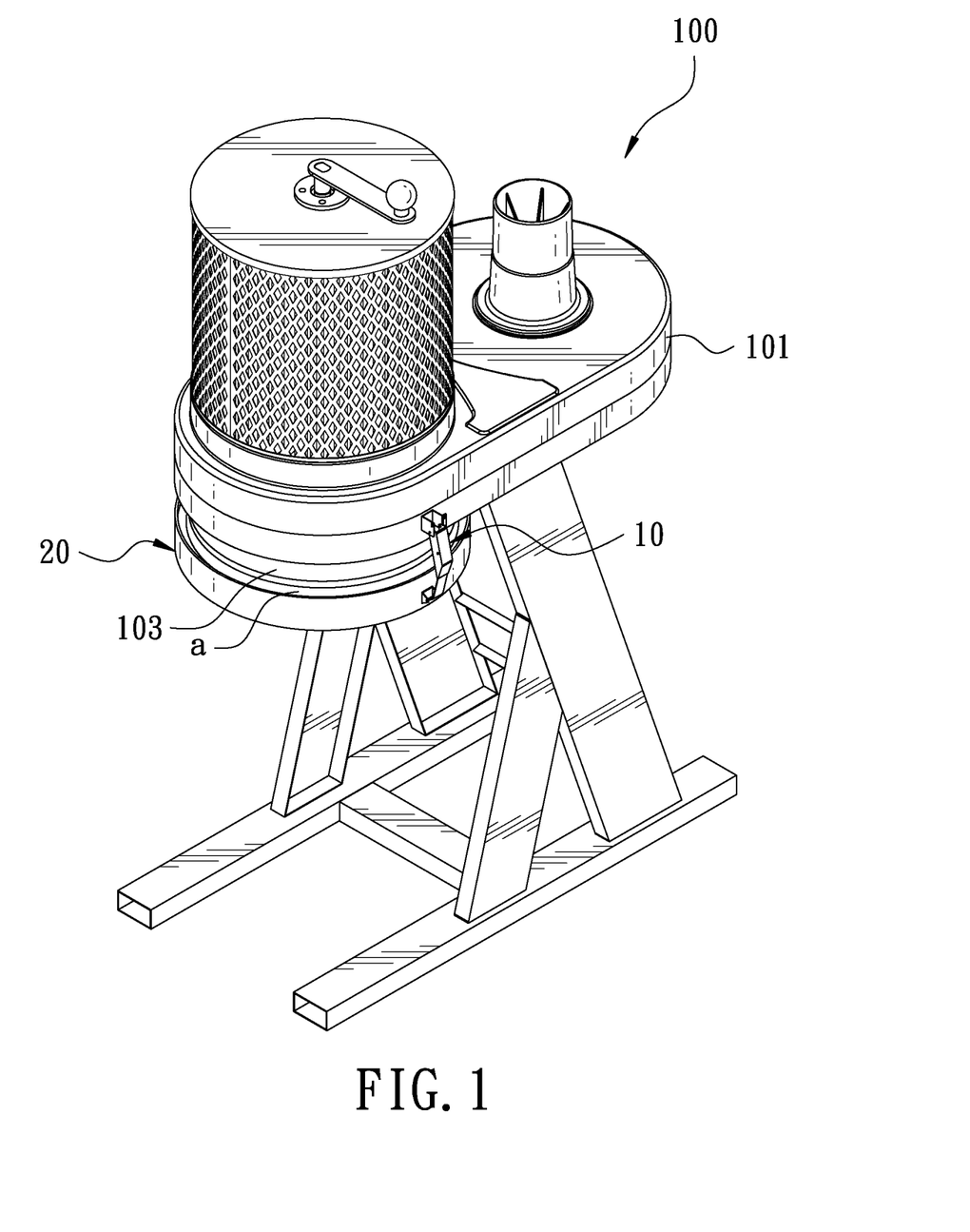
FIG. 1 is a combination perspective view of a dust collector in the present invention.
Figure 2:
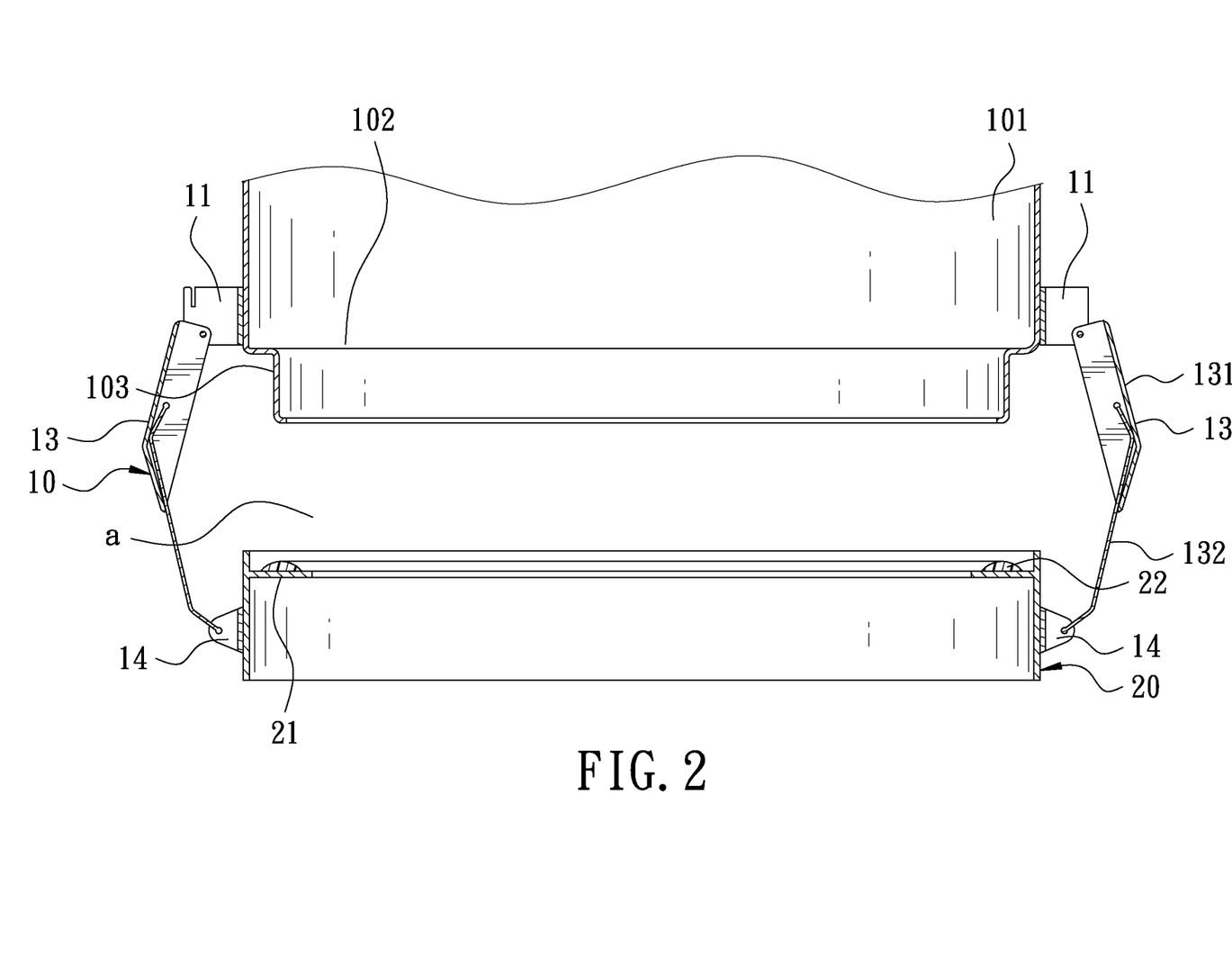
FIG. 2 is a cross-sectional view of fixing device for the dust bag of a dust collector in the present invention.

A preferred embodiment of a fixing device for the dust bag of a dust collector in the present invention, as shown in FIGS. 1 and 2, includes a dust collector 100 provided with a wind guide box 101 having a lower side formed with a stuff falling opening 102, which has its circumferential edge extending outward to form a ring body. The fixing device includes two tightening units 10 and an annular frame 20 as main components combined together.

Figure 3:
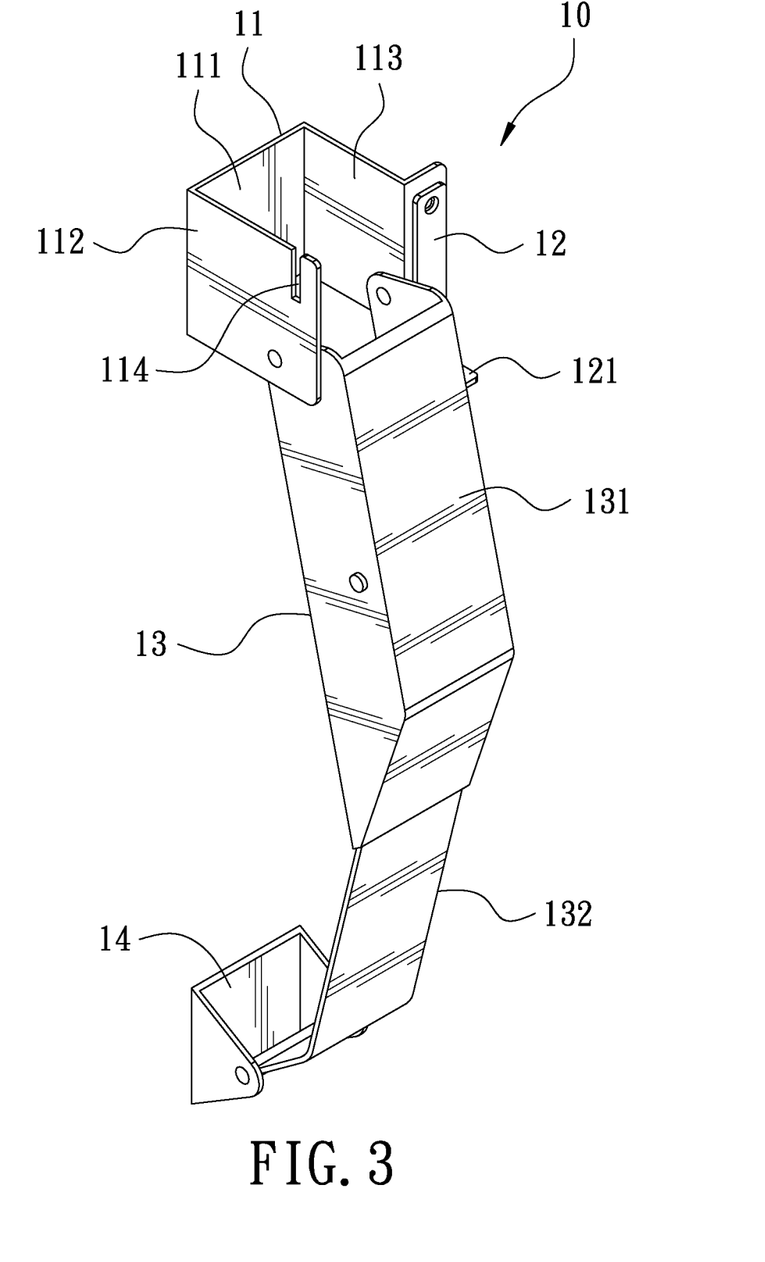
FIG. 3 is combination cross-sectional view of a tightening unit of the fixing device for the dust bag of a dust collector in the present invention.

The two tightening units 10 are respectively and correspondingly provided at an outer circumference of the wind guide box 101. Referring to FIG. 3, each tightening unit 10 contains a first fixing member 11 provided with a fixed plate 111, which is fixed with the wind guide box 101. The fixed plate 111 has two sides respectively provided with a left side plate 112 and a right side plate 113, and the left side plate 112 is bored with a notch 114 with an upward opening, while the right side plate 113 is vertically disposed with a pivotal face 115 corresponding to the notch 114 of the left side plate 112 and pivotally provided with a stop plate 12. Further, the first fixing member 11 is pivotally set with an adjusting member 13 formed with a pulling part 131, which has one end pivotally connected with the first fixing member 11. The pulling part 131 has an intermediate portion pivotally provided with an adjusting plate 132, which has another end pivotally connected with a second fixing member 14.

The annular frame 20 is secured with the second fixing member 14 and positioned beneath the ring body 103. The annular frame 20 is ring-shaped and its diameter is larger than that of the ring body 103. The annular frame 20 has its inner side wall annularly mounted with a position-limiting flange 21 fixed thereon with an annular gasket 22. Furthermore, the annular frame 20 can be adjusted to a first position or to a second position through the tightening units 10. When the annular frame 20 is at the first position, a gap (a) is formed between the annular frame 20 and the ring body 103, and if the annular frame 20 is adjusted to be at the second position, the annular frame 20 will closely contact with the lower edge of the ring body 103.

Figure 4:
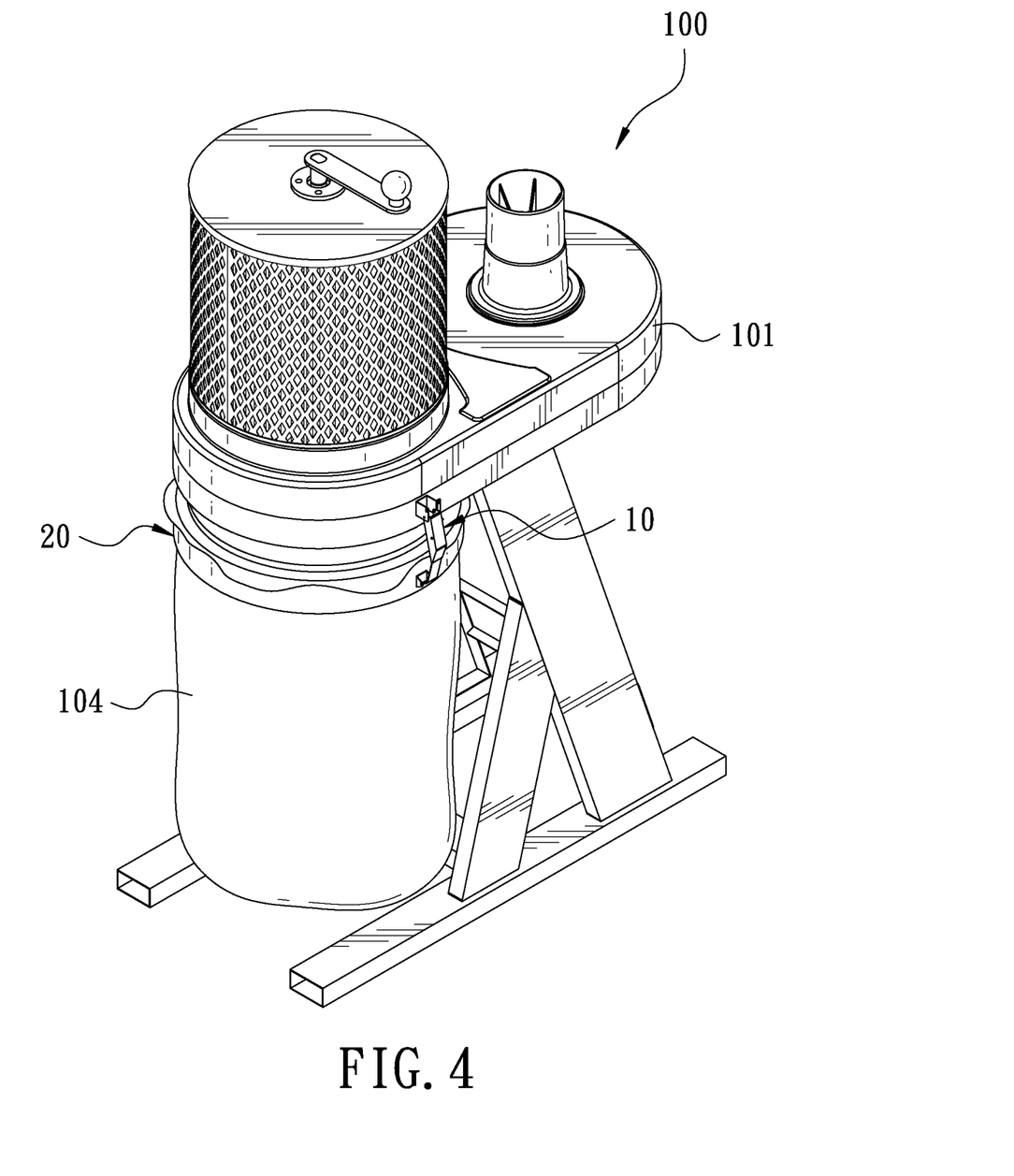
FIG. 4 is schematic view of the fixing device for the dust bag of a dust collector in the present invention, showing that the dust bag is inserted in the gap between an annular frame and a ring body.
Figure 5:
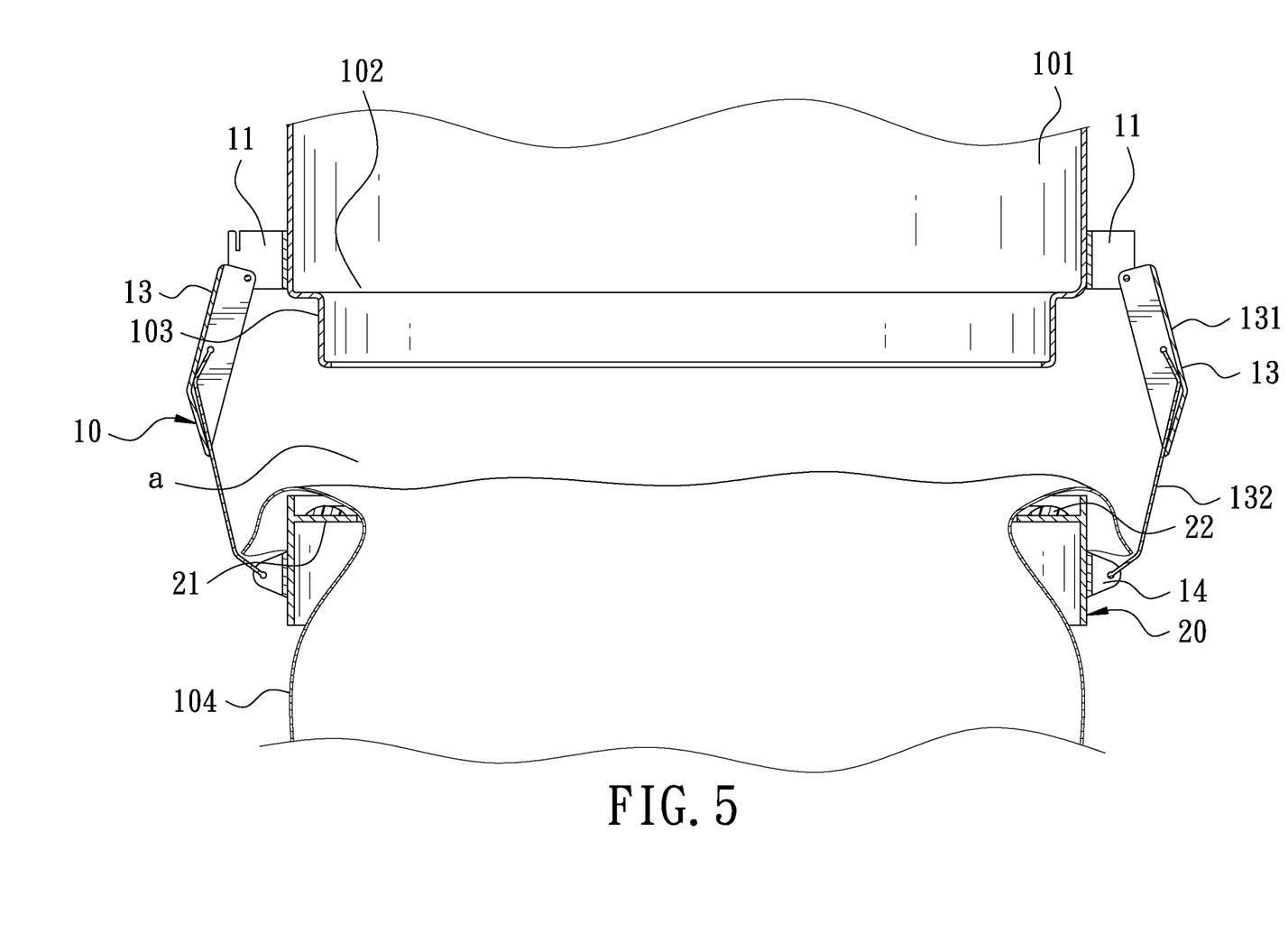
FIG. 5 is a partial cross-sectional view of the fixing device for the dust bag of a dust collector in a using state in the present invention.
Figure 6:
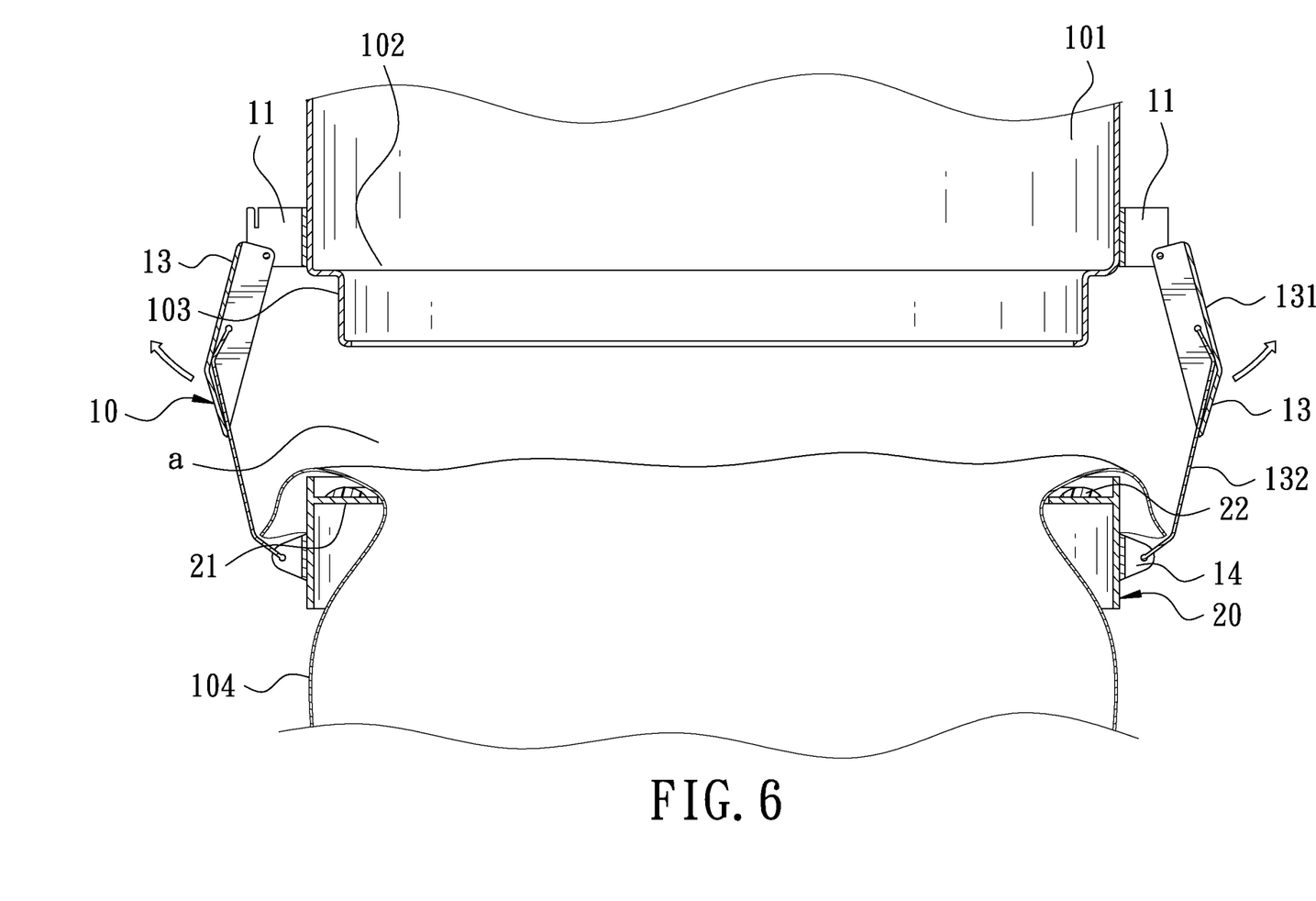
FIG. 6 is schematic view of the fixing device for the dust bag of a dust collector in the present invention, showing a state that a pulling part is pulled upward.
Figure 7:
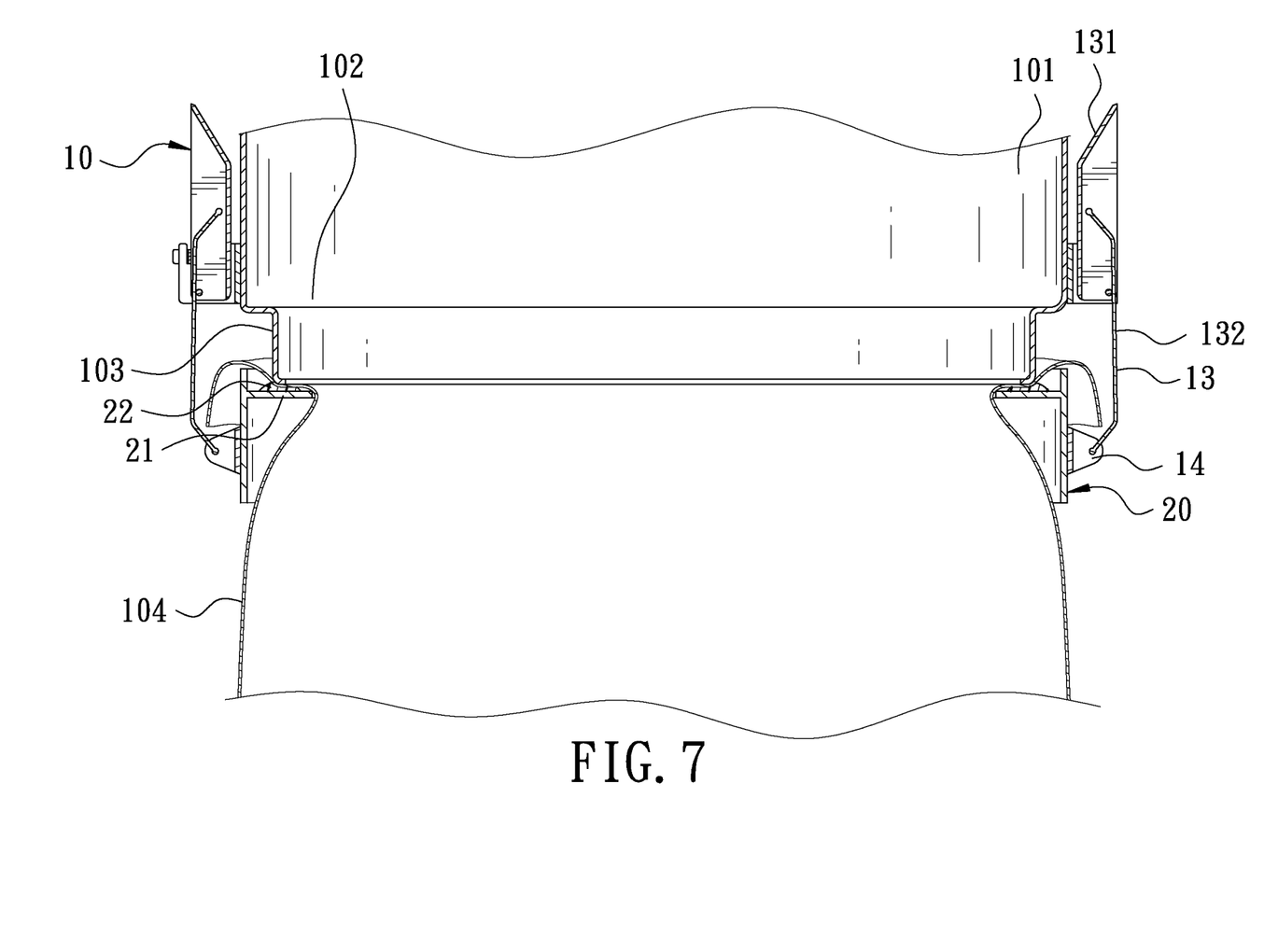
FIG. 7 is a cross-sectional view of the fixing device for the dust bag of a dust collector in the present invention, showing a state that the dust bag is fixed around the annular flange of the stuff falling opening.
Figure 8:
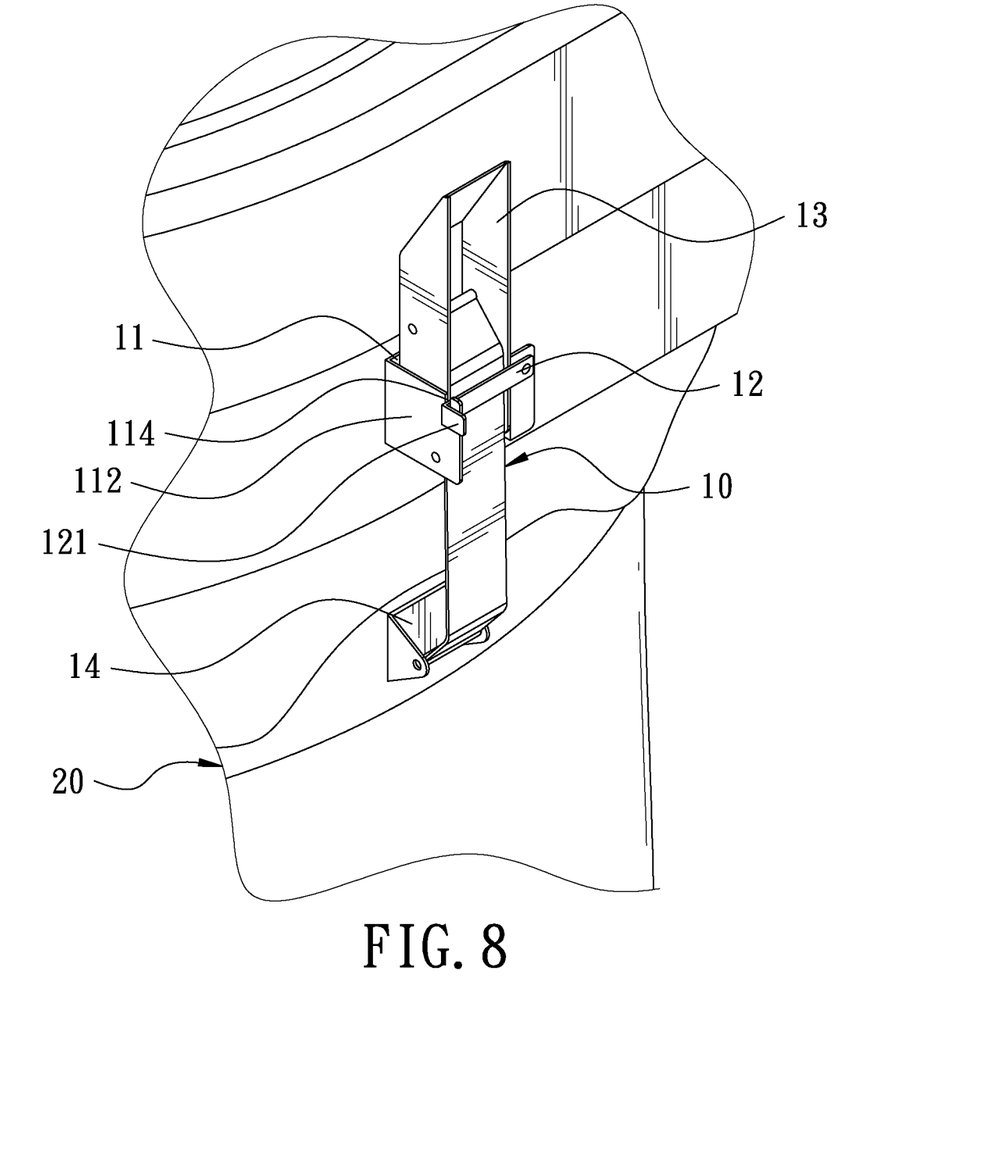
FIG. 8 is a partial magnified view showing a state that a stop plate fixes an adjusting member in plate in the present invention.

Referring to FIGS. 4 and 5, to assemble a dust bag 104 under the stuff falling opening 102, firstly have the annular frame 20 adjusted to be at the first position by means of the tightening units 10 and then, have the opening of the dust bag 104 inserted through the annular frame 20 from bottom to top and then, have the opening of the dust bag 104 inserted out of the gap (a) between the annular frame 20 and the ring body 103 and folded reversely around the upper edge of the annular frame 20, letting the dust bag 104 positioned temporarily on the annular frame 20. Subsequently, referring to FIGS. 6 and 7, the pulling parts of the adjusting members 13 are pulled up at the same time to let the annular frame 20 adjusted to the second position to make the dust bag 104 sandwiched and fixed in place by both the annular frame 20 and the lower edge of the ring body 103, and the tightness of sealing of both the annular frame 20 and the ring body 103 can be enhanced by the gasket 22, letting the interior of both the dust bag 104 and the wind guide box 101 form a closed state. Lastly, referring to FIG. 8, the free end of the stop plate 12 is turned upward to be engaged with the notch 114 of the first fixing member 11, letting the stop plate 12 positioned at one side of the adjusting member 13 to form a blocking effect for restrictedly positioning the adjusting member 13 and further fixing the annular frame 20 at the second position. Thus, the dust bag 104 can be quickly fixed in place by a single person.

When the dust bag 104 needs to be replaced with a new one, the stop plate 13 is turned upward to let the stop plate 13 disengaged from the notch 114 and no longer restrictedly position the adjusting member 13. Next, the pulling part 131 is pulled downward to let the annular frame 20 restore to the first position and at this time, referring to FIG. 6, the gap (a) is formed between the annular frame 20 and the ring body 103 so that the dust bag 104 can be removed out. Thus, the dust bag 104 can be quickly dissembled by a single person.

The special feature of this invention is that a user needs only to operate the two tightening units 10 to control the annular frame 20 to move upward or downward for completing operation of assembling or disassembling the dust bag 104, and the operation can be easily carried out by a single person. Compared with the conventional method of fixing the dust bag, this invention can really reduce manpower and cost and further enhance working efficiency.

While the preferred embodiment of this invention has been described above, it will be recognized and understood that various modifications may be made therein and the appended claims are intended to cover all such modifications that may fall within the spirit and scope of the invention.

What is claimed is:

1. A fixing device for the dust bag of a dust collector comprising a dust collector, said dust collector provided with a wind guide box, said wind guide box having a lower side formed with a stuff falling opening, said stuff falling opening having a circumferential edge extending downward to form a ring body; and further comprising:
   at least two tightening units respectively and correspondingly provided at an outer circumference of said wind guide box, each said tightening unit comprising a first fixing member, said first fixing member having one end firmly fixed with said wind guide box, said first fixing member having another end provided with an adjusting member, said adjusting member having another end disposed with a second fixing member;
   an annular frame secured with said second fixing members and located beneath said ring body, said annular frame being ring-shaped, said adjusting member able to adjust said annular frame to be at a first position and at a second position, a gap formed between said annular frame and said ring body when said annular frame is adjusted to be at the first position, said annular frame pressing against a lower edge of said ring body when said annular frame is adjusted to be at the second position; and
   each said first fixing member comprises a fixed plate, said fixed plate fixedly combined with said wind guide box, said fixed plate having two sides respectively disposed with a left side plate and a right side plate parallel to each other, said left side plate bored with a notch with an upward opening, said right side plate vertically provided with a pivotal face corresponding to said notch of said left side plate, said pivotal face pivotally set with a stop plate, a free end of said stop plate able to be engaged with said notch when said annular frame is at the second position, letting said stop plate positioned at a front side of said adjusting member to form a blocking effect.

2. The fixing device for the dust bag of a dust collector as claimed in claim 1, wherein each said adjusting member comprises a pulling part, said pulling part having one end pivotally connected with one end of said first fixing member, said pulling part having an intermediate portion pivotally provided with an adjusting plate, said adjusting plate having another end pivotally combined with said second fixing member.

3. The fixing device for the dust bag of a dust collector as claimed in claim 1, wherein a diameter of said annular frame is larger than that of said ring body, said annular frame having an inner side wall transversely and annularly mounted with a position-limiting flange, said annular frame annularly positioned around an outer side of said ring body and said annular frame having said position-limiting flange pressing against a lower edge portion of said ring body when said annular frame is at the second position.

4. The fixing device for the dust bag of a dust collector as claimed in claim 3, wherein said position-limiting flange of said annular frame is fixed thereon with an annular gasket, said annular gasket and the lower edge of said ring body closely contacting with each other when said annular frame is at the second position.

* * * * *